Nov. 16, 1954     V. N. IPATIEFF ET AL     2,694,730
DERIVATIVES OF BICYCLOOCTENE HYDROCARBONS
AND PRODUCTION THEREOF
Filed Oct. 2, 1951
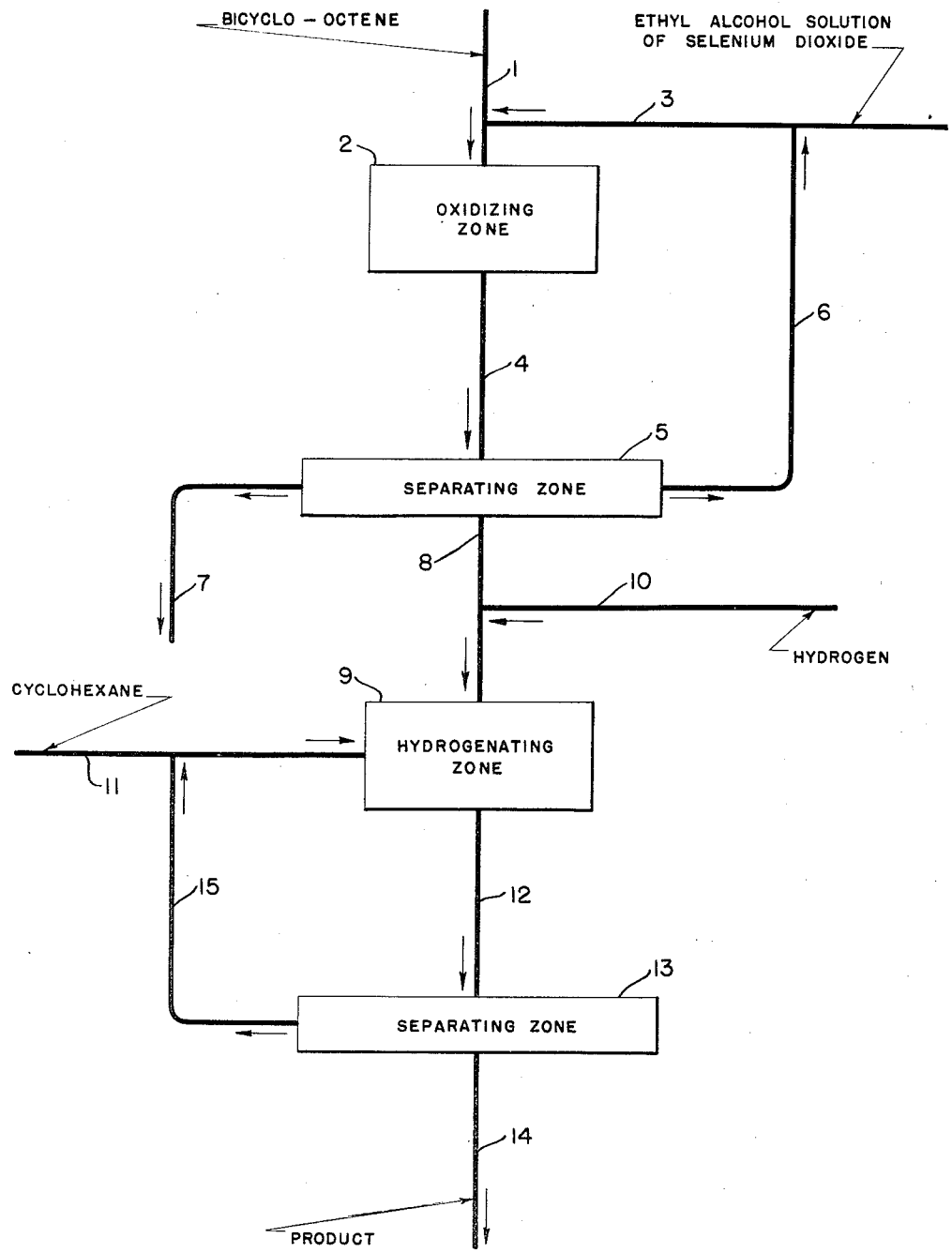
INVENTORS:
VLADIMIR N. IPATIEFF
HERMAN PINES
BY: Chester J. Giuliani
Donald E. Moehling
ATTORNEYS:

United States Patent Office 2,694,730
Patented Nov. 16, 1954

2,694,730

DERIVATIVES OF BICYCLOOCTENE HYDROCARBONS AND PRODUCTION THEREOF

Vladimir N. Ipatieff and Herman Pines, Chicago, Ill., assignors to Universal Oil Products Company, Chicago, Ill., a corporation of Delaware Application October 2, 1951, Serial No. 249,256

12 Claims. (Cl. 260—598)

This invention relates to the conversion of a bicyclooctene hydrocarbon into a aldehyde oxidation product and the further conversion of the latter into a bicyclic alcohol, if desired. A more specific application of the process relates to the conversion of 2,6-dimethyl-bicyclo-[3.2.1]-2-octene into intermediates useful in the production of pharmaceuticals, insecticides, resins, etc.

An object of this invention is the production of a 2-formyl-6-hydrocarbon substituted bicyclo-[3.2.1]-2-octene. Another object of this invention is to provide a process for the manufacture of 2-formyl-6-methylbicyclo-[3.2.1]-2-octene. Still another object of this invention is the production of 2-hydroxymethyl-6-methylbicyclo-[3.2.1]-octane.

One embodiment of the invention concerns a process for producing a 2-hydroxymethyl-6-hydrocarbon substituted bicyclo-[3.2.1]-octane, wherein the hydrocarbon substituent is selected from the group consisting of alkyl, cycloalkyl, aryl, aralkyl, and alkaryl.

Another embodiment of this invention relates to a process for producing 2-hydroxymethyl-6-methylbicyclo-[3.2.1]-octane which comprises oxidizing 2,6-dimethyl-bicyclo-[3.2.1]-2-octene to produce 2-formyl-6-methylbicyclo-[3.2.1]-2-octene and hydrogenating said 2-formyl-6-methylbicyclo-[3.2.1]-2-octene to form 2-hydroxymethyl-6-methylbicyclo-[3.2.1]-octane.

Another embodiment of this invention relates to a process for producing 2-formyl-6-methylbicyclo-[3.2.1]-2-octene which comprises oxidizing 2,6-dimethylbicyclo-[3.2.1]-2-octene by heating with selenium dioxide and ethyl alcohol, and recovering the resultant 2-formyl-6-methylbicyclo-[3.2.1]-2-octene.

Still another embodiment of this invention concerns a process for producing 2-hydroxymethyl-6-methylbicyclo-[3.2.1]-octane which comprises subjecting 2,6-dimethylbicyclo-[3.2.1]-2-octene to mild oxidation sufficient to effect conversion of the 2-methyl group to formyl, reacting the resulting 2-formyl-6-methylbicyclo-[3.2.1]-2-octene with hydrogen in the presence of a hydrogenating catalyst.

Other embodiments of the invention relate to 2-formyl-6-methylbicyclo-[3.2.1]-2-octene and to 2-hydroxymethyl-6-methylbicyclo-[3.2.1]-octane as novel compositions of matter.

This invention relates to a process for converting 2-methyl-6-hydrocarbon substituted bicyclo-[3.2.1]-2-octenes, having the structure represented in the following structural formula:

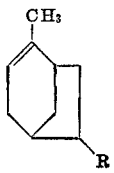

wherein R is selected from the group consisting of hydrogen, alkyl, cycloalkyl, aryl, alkaryl and aralkyl into an aldehyde having the structure:

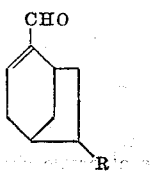

wherein R is selected from the group consisting of hydrogen, alkyl, cycloalkyl, aryl, aralkyl and alkaryl. The aldehyde may, in accordance with a further embodiment of the present invention be converted into the alcohol having the structure:

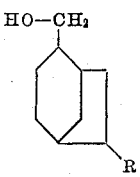

wherein R is selected from the group consisting of hydrogen, alkyl, cycloalkyl, aryl, aralkyl and alkaryl. The invention is particularly directed to a process for converting 2,6-dimethylbicyclo-[3.2.1]-2-octane into the aldehyde: 2-formyl-6-methylbicyclo-[3.2.1]-2-octene and the latter, if desired, into an alcohol, namely, 2-hydroxymethyl-6-methylbicyclo-[3.2.1]-octane.

The bicyclooctene hydrocarbon used as a starting material in this process may be obtained from any suitable source of the compound, including recovery from natural products or synthesis from other starting materials. Thus the compound, 2,6-dimethylbicyclo-[3.2.1]-2-octene may be produced by dehydration of terpineol in the presence of a dehydrating agent therefor, including a phosphoric acid, such as metaphosphoric acid, pyrophosphoric acid, tetraphosphoric acid, etc. The latter acids are preferably composited with a siliceous adsorbent such as kieselguhr, clay, etc. to form a silico-phosphoric acid catalyst, generally known in the art as a "solid phosphoric acid," these composites being formed by calcining a mixture of the acid itself, preferably pyrophosphoric acid, with kieselguhr at temperatures of from about 300° to about 500° C. until a silico-phosphate complex is formed. The starting materials have the structure of a 6-hydrocarbon substituted 2-methylbicyclo-[3.2.1]-2-octene in which the 6-hydrocarbon substituent is either a saturated or aryl substituent. Typical of such compounds useful as the initial reactants in the process include 2,6-dimethylbicyclo-[3.2.1]-2-octene, 2-methyl-6-phenylbicyclo-[3.2.1]-2-octene, 2-methyl-6-cyclohexyl-bicyclo-[3.2.1]-2-octene, 2-methyl-6-(p-methylphenyl)-bicyclo-[3.2.1]-2-octene, 2-methyl-6-(beta-phenylpropyl)-bicyclo-[3.2.1]-2-octene, and others. One of the preferred present starting materials, 2,6-dimethylbicyclo-[3.2.1]-2-octene, is formed by reacting limonene, terpineol, or terpin hydrate in the presence of the phosphoric acid, preferably by passing the starting material over solid phosphoric acid catalyst, or by mixing the catalyst and starting material, at a temperature of from about 125° to about 400° C., and preferably at from about 175° to about 325° C. at atmospheric or at a superatmospheric pressure, up to about 20 atmospheres. Although the bicyclic octene is preferably derived from the above indicated synthetic source, other sources of the reactant may be suitably utilized and other methods of synthesis are available for the production of the 2-methyl-6-hydrocarbon substituted bicyclo-[3.2.1]-2-octene reactants.

The aldehyde product which may also be considered as an intermediate in the production of the ultimate alcohol product of the present process, that is, the aldehyde: 2-formyl-6-hydrocarbon substituted bicyclo-[3.2.1]-2-octene is formed in accordance with the first stage of the present process by means of an oxidation process wherein only the 2-methyl group is selectively attacked by the oxidizing agent and the process is continued only until the 2-methyl group is oxidized, but no further change in the structure of the starting material occurs. In general, suitable oxidizing agents for this purpose are the compounds which yield only a predetermined quantity of oxygen in the presence of an oxidizable organic compound and which may be tempered or otherwise restricted in its oxidizing activity to oxidize the methyl group only to the corresponding formyl group. Selenium dioxide suspended in an inert organic diluent has been found to accomplish the selective type of oxidation preferred in the present oxidation reaction when the reaction is carried out at a temperature of from about 50° to about 150° C. The inert organic diluent serves as a solvent of the charging stock and distributes the bicyclooctene reactant throughout the mass of oxidizing agent, thereby bringing the reactant in intimate contact with the oxidizing agent. It is generally preferred when utilizing selenium dioxide as the oxidizing agent, to employ not more than about equimolecular proportions of the selenium dioxide and bicyclooctene reactants, having available in the reaction mixture a sufficient quantity of selenium dioxide to provide only the amount required to convert the 2-methyl substituent on the bicyclooctene in the corresponding formyl radical, although less than an equimolar ratio of selenium dioxide to bicyclooctene may be utilized and incomplete conversion of charging stock to the formyl substituted compounds thereby obtained. In the latter instance, the unconverted starting material may be recovered from the products of the reaction and recycled in the oxidation process.

The solvent-diluent characterized as an inert organic compound is desirably a normally liquid compound which preferably dissolves at least a portion of the selenium dioxide oxidizing agent charged to the reaction. Among the solvents useful for this purpose include the aliphatic alcohols, ketones, etc., as well as the aromatic hydrocarbons, such as benzene, toluene, xylene, etc. The aliphatic organic compounds particularly suitable as solvents are the relatively low molecular weight members of this group of compounds, such as methanol, ethanol, acetone, methyl ethyl ketone, dioxane, ethylene glycol and others characterized as above. A solvent which dissolves at least from about 2 to about 10% by weight of selenium dioxide is preferred in order to accomplish the conversion with as low an inventory of solvent as possible and to effect the oxidation within a reasonable period of time. The products of the oxidation reaction may be separated from each other and from unreacted starting material, if any, by any suitable means, as for example, by fractional distillation, after recovery of the solvent for recycling purposes. The latter fractional distillation may be effected at either atmospheric or subatmospheric pressures, although reduced pressures may be necessary only to accomplish the distillation of the high boiling ends of the reaction product, thereby reducing the temperature at which the product distills.

The present invention also concerns a process for converting the 2-formyl-6-hydrocarbon substituted bicyclo-[3.2.1]-2-octene product of the initial oxidation stage of the process to the corresponding 2-hydroxy-6-hydrocarbon substituted bicyclooctane by a hydrogenation step in which the formyl-substituted compound may be considered an intermediate in the final production of the alcohol. When the latter alcohol is the desired product of the reaction, it may be readily produced from the prior aldehyde intermediate by reduction at hydrogenating reaction conditions sufficient to saturate the double bond of the bicyclooctene ring and convert the formyl group to a methylol substituent. The hydrogenation is generally conducted in the presence of a catalyst which promotes the reaction and for this purpose any suitable catalyst of normal hydrogenating activity may be employed, such as a supported nickel and/or cobalt catalyst, an element selected from group VIII of the periodic table, preferably platinum and/or palladium, or a sulfide or oxide of such group VIII element, either alone or supported on a refractory metal oxide; other well-known hydrogenation catalysts may likewise be employed to effect the hydrogenation. One of the preferred catalysts for hydrogenation of the present aldehyde intermediate is a composite of nickel and/or cobalt on a suitable supporting material, such as kieselguhr, alumina, silica or other porous refractory support. The catalyst is prepared by procedures well-known in the art and generally contains from about 0.01 to about 10% by weight of the hydrogenating metal, metal oxide, or metal sulfide composited with the porous support. Hydrogenation of the formyl-substituted bicyclooctene intermediate is accomplished at temperatures of from about 30° to about 200° C. in the presence of hydrogen, desirably in the proportion of at least one mol of hydrogen per mol of the aldehyde intermediate, and preferably in the presence of from about 10 to about 20 mols of hydrogen per mol of aldehyde reactant at superatmospheric hydrogen pressures, up to about 500 atmospheres. The mixture of hydrogen and aldehyde reactants is preferably passed over a fixed bed of the hydrogenation catalyst in a continuous type of operation, although the reactants may also be mixed with the catalyst in a stirred pressure autoclave and the reaction mixture subsequently recovered from the catalyst by decantation, filtering or other means. Following completion of the hydrogenation, as indicated by the failure of the reaction pressure to continue to fall in the reaction vessel, the resulting bicyclooctyl alcohol may be recovered from the reaction products by any suitable means.

The process flow involved in the production of either the aldehyde or alcohol product is further described in the accompanying diagram which, for the sake of simplicity, is described with reference to the use of a selenium oxide catalyst and an ethyl alcohol solvent for the bicyclooctene charging stock. Referring to the accompanying diagram, a 2-methyl-6-hydrocarbon substituted bicyclo-[3.2.1]-2-octene is charged into the process flow through line 1 leading into oxidizing zone 2. If the oxidation is operated on a continuous basis, the oxidizing agent comprising a solution of selenium dioxide in ethyl alcohol, for example, containing up to about 5 to 7% of the oxide in the alcohol, is simultaneously introduced into oxidizing zone 2 with the bicyclooctene charging stock through line 3 which connects with line 1 leading into said zone 2. The proportion of selenium dioxide to bicyclooctene is adjusted to provide an approximately equimolar ratio of oxide and hydrocarbon to accomplish the selective oxidation of the latter to the aldehyde. The mixture of hydrocarbon and selenium dioxide in ethyl alcohol are maintained in zone 2 at oxidizing reaction conditions, that is, at a temperature of from about 30° to about 150° C. and at a sufficiently superatmospheric pressure to maintain the reactants in substantially liquid phase. The oxidation is continued until the charging stock has been completely converted to the aldehyde or until the oxidizing capacity of the selenium dioxide is depleted. The products of the oxidation reaction are withdrawn from zone 2 through line 4 into separating zone 5 wherein the ethyl alcohol solvent is desirably separated as one fraction for recycling through line 6 to line 3 wherein the alcohol is utilized to make up the selenium dioxide solution supplied to zone 2. The product comprising a 2-formyl-6-hydrocarbon substituted bicyclo-[3.2.1]-2-octene is separated as a distinct fraction from the products of the oxidation reaction in zone 5 and removed therefrom through line 7. Separating zone 5 may suitably comprise a fractional distillation zone which may be operated at subatmospheric pressures, if desired, in order to segregate the desired aldehydic oxidation product.

Where the aldehyde is produced merely as an intermediate in the ultimate production of a 2-hydroxymethyl-6-hydrocarbon substituted bicyclo-[3.2.1]-octane, the aldehyde separated in zone 5 is removed therefrom through line 8 instead of through line 7 into hydrogenating zone 9 containing a suitable solid hydrogenation catalyst over which the aldehyde derivative is passed in the presence of hydrogen introduced into the process flow through line 10 connecting with line 8. The aldehyde charging stock to zone 9 is desirably dissolved in a suitable solvent-diluent thereof, such as a saturated hydrocarbon, a particularly useful solvent comprising cyclohexane which is introduced into zone 9 through line 11, desirably at the top of the latter zone where it dissolves the aldehyde and carries it downwardly over the hydrogenation catalyst into zone 9. Hydrogenation is accomplished in the latter zone at a temperature of from about 30° to about 200° C., depending upon the particular hydrogenation catalyst utilized, while the pressure is maintained at a superatmospheric level, up to about 500 atmospheres, although, generally, pressures up to about 100 atmospheres are sufficient. The products of the hydrogenation reaction are removed from zone 9 through line 12 and discharged into separating zone 13 wherein the bicyclic alcohol product: a 2-hydroxymethyl-6-hydrocarbon substituted bicyclo-[3.2.1]-octane is separated from the remaining products of the reaction and removed therefrom through line 14. The cyclohexane solvent which may be recovered unchanged from the reaction product is removed from zone 13 through line 15 and desirably recycled to line 11 leading into hydrogenation zone 9 wherein the cyclohexane is utilized as a solvent for the aldehyde charging stock. Separating zone 13 may be a fractional distillation column, for example which may be operated at atmospheric or subatmospheric pressures, if desired.

The present invention is further illustrated with respect to certain specific embodiments thereof in the following example, which, however, is not intended to limit the scope of the invention in strict accordance therewith.

A mixture consisting of 136 g. (1 mol) of 2,6-dimethylbicyclo-[3.2.1]-2-octene which was produced by passing limonene over a silico-phosphoric acid or "solid phosphoric acid" catalyst at 200–210° C., and separated as the fraction boiling from 159–161° C., together with 111 g. (1 mol) of selenium dioxide and 400 ml. of absolute alcohol was refluxed at the boiling point of the alcohol for five hours. The alcohol was then distilled off and the remaining material steam distilled. The steam distillate was dried and distilled at 4 mm. mercury pressure to recover an aldehydic product fraction boiling from 70 to 77° C. and having a refractive index, $n_D^{20}$ of 1.4912.

Analysis:
Calcd. for $C_{10}H_{14}O$: C, 79.95; H, 9.39
Found: C, 80.10; H, 9.59

The dinitrophenylhyrozone of the above fraction melted at 225°–227° C. and analyzed as follows:

Calcd. for $C_{16}H_{18}N_4O_4$: C, 58.17; H, 5.49; N, 16.96
Found: C, 58.39; H, 5.68; N, 17.02

The aldehyde separated as the fraction boiling from 70–77° C. of the above oxidation reaction product may be reduced to the alcohol: 2-hydroxymethyl-6-methyl-bicyclo-[3.2.1]-octene by means of the following procedure: 70 g. of the aldehyde prepared as indicated above was dissolved in 81 ml. of cyclohexane and was stirred in the cyclohexane solution at a temperature of 60–65° C. with 8 grams of a nickel-kieselguhr hydrogenated catalyst contained in a stainless steel rotating autoclave at an initial hydrogen pressure of 110 atmospheres. The products of the reaction were distilled at 6 mm. pressure and the fraction boiling from 95–98° C. collected as the desired product. The fraction had a refractive index, $n_D^{20}$ of 1.4870 and a density of $D^{20}_4$ of 0.9791. Analysis of the fraction yielded the following results:

Calculated for $C_{10}H_{18}O$: C, 77.92; H, 11.69, $M_R$, 45.2
Found: C, 77.6; H, 11.9, Mr, 45.5

The dinitrobenzoate derivative of the alcohol was prepared (melting point 76–77° C.) and its analysis is as follows:

Calcd. for $C_{17}H_{20}N_2O_6$: C, 58.61; H, 5.79; N, 8.04
Found: C, 59.06; H, 5.31; N, 8.06

We claim as our invention:

1. A 2-formyl-6-hydrocarbon substituted bicyclo-[3.2.1]-2-octene, in which the 6-hydrocarbon substituent is selected from the group consisting of alkyl, cycloalkyl, aryl, aralkyl, and alkaryl.

2. 2-Formyl-6-methylbicyclo-[3.2.1]-2-octene.

3. 2-Formyl-6-phenylbicyclo-[3.2.1]-2-octene.

4. A process which comprises oxidizing in the presence of selenium dioxide a 2-methyl-6-hydrocarbon substituted bicyclo-[3.2.1]-2-octene wherein the 6-hydrocarbon substituent is selected from the group consisting of alkyl, cycloalkyl, aryl, aralkyl and alkaryl, to form a 2-formyl-6-hydrocarbon substituted bicyclo-[3.2.1]-2-octene.

5. A process for the production of 2-formyl-6-methylbicyclo-[3.2.1]-2-octene which comprises selectively oxidizing the 2-methyl group of 2,6-dimethylbicyclo-[3.2.1]-2-octene in the presence of selenium dioxide to thereby form said 2-formyl-6-methylbicyclo-[3.2.1]-2-octene.

6. The process of claim 5 further characterized in that said oxidation is effected at a temperature of from about 50° C. to about 150° C.

7. The process of claim 5 further characterized in that said oxidation is effected in the presence of not more than equimolar proportions of selenium dioxide and 2,6-dimethylbicyclo-[3.2.1]-2-octene.

8. The process of claim 5 further characterized in that said selenium dioxide is dissolved in an inert organic solvent therefor.

9. The process of claim 8 further characterized in that said organic solvent is ethyl alcohol.

10. A process for producing 2-hydroxymethyl-6-methylbicyclo-[3.2.1]-octane which comprises hydrogenating 2-formyl-6-methylbicyclo-[3.2.1]-2-octene.

11. The process of claim 10 further characterized in that said hydrogenation is effected in the presence of a saturated hydrocarbon solvent of said octene.

12. The process of claim 11 further characterized in that said solvent is cyclohexane.

References Cited in the file of this patent

UNITED STATES PATENTS

| Number | Name | Date |
|---|---|---|
| 2,427,345 | Bain | Sept. 16, 1947 |
| 2,435,403 | Morris et al. | Feb. 3, 1948 |
| 2,530,923 | Turk et al. | Nov. 21, 1950 |

OTHER REFERENCES

J. Organic Chem., vol. 12, page 34 (1947).

Huekel et al., Chem. Abstracts, vol. 41, pages 3077–3078 (1947).

Kazanskii et al., Chem. Abstracts, vol. 45, page 1544–1545 (1951). Abstract of article published in 1950.

Newman et al., J. American Chem. Soc., vol. 74, pages 507–509. Article received July 9, 1951, published Jan. 20, 1952.